United States Patent Office 3,370,218
Patented Feb. 20, 1968

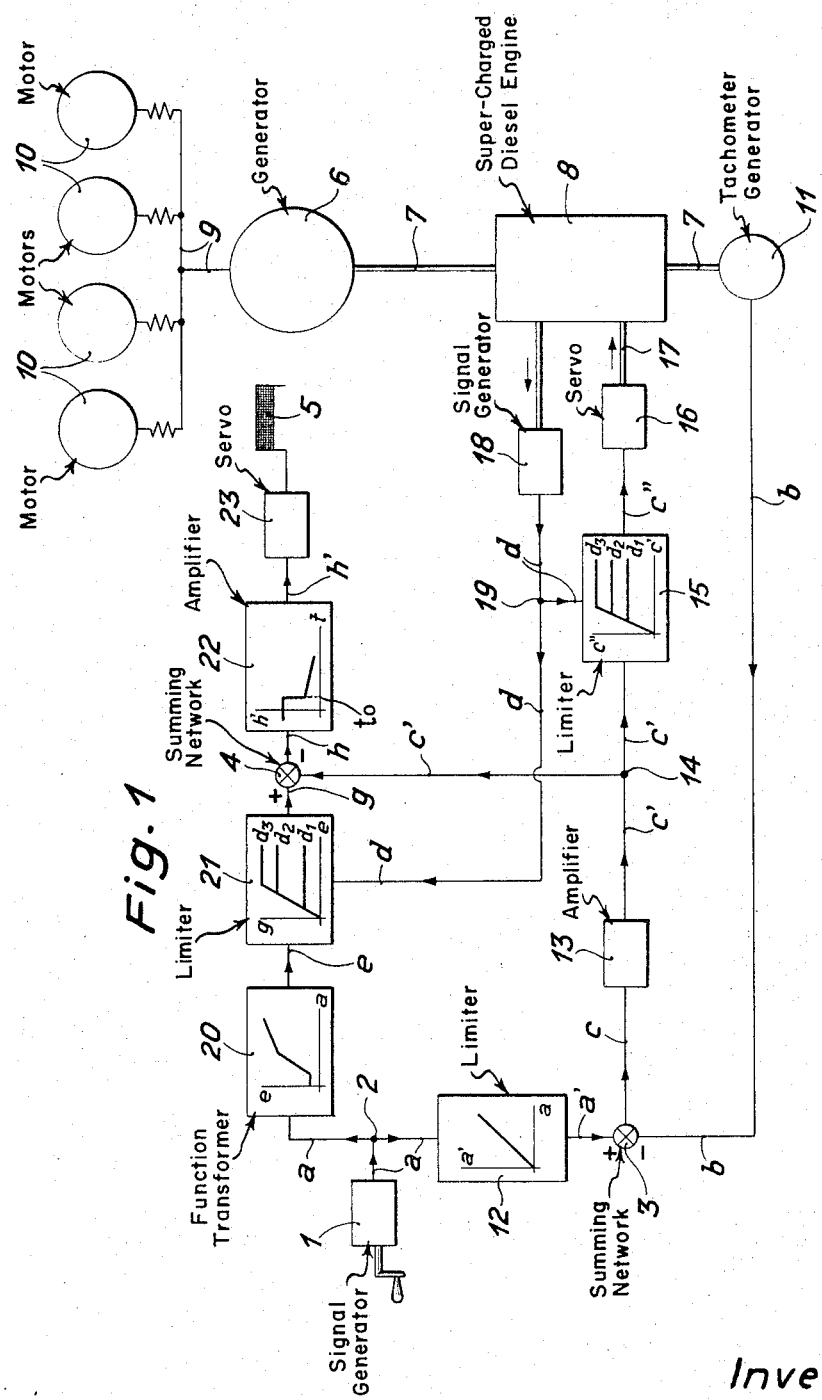

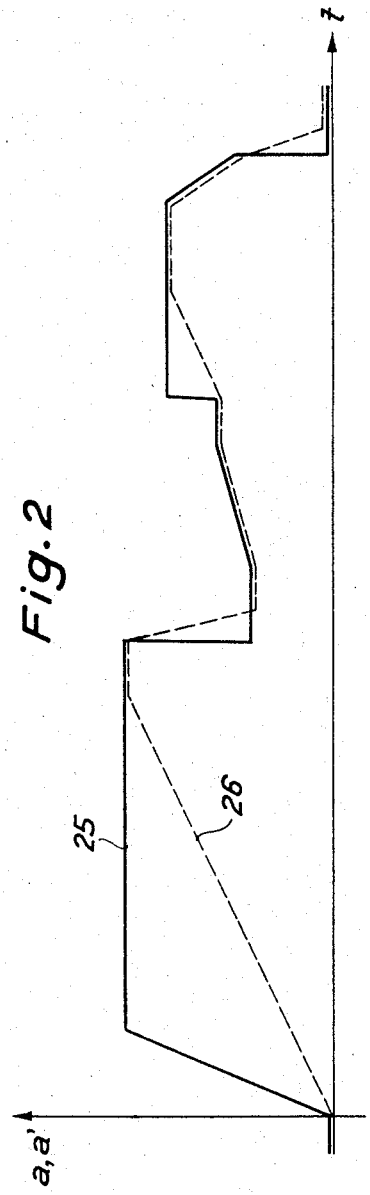

3,370,218
CONTROL SYSTEM FOR DIESEL-ELECTRIC
TRACTION VEHICLES
Peter Merz, Winterthur, Switzerland, assignor to Sulzer Brothers Limited, Winterthur, Switzerland, a Swiss company
Filed Mar. 2, 1966, Ser. No. 531,189
Claims priority, application Switzerland, Mar. 5, 1965, 3,112/65
5 Claims. (Cl. 322—15)

The present invention pertains to a control system for diesel-electric traction vehicles in which a diesel engine drives direct current electric traction motors of the series type (i.e. having series-connected armature and field windings), with the aid of an electric generator coupled to the diesel engine. In the control system of the invention an actual value signal representative of the diesel engine speed (i.e. its r.p.m.) and a reference or set-value or command signal developed in a set-value signal generator are compared to form an error signal. This error signal is employed to control the quantity of fuel injected into the cylinders of the diesel engine by the injectors or injection pumps thereof in order to control the engine speed. In addition, this error signal is compared with the set-value signal as modified or reformed in a function generator into a set-value signal for engine load, and the result of this comparison is employed to control excitation of the generator as a means of governing the power output from the engine. Lastly, a signal derived from the air pressure in the diesel engine supercharger is employed to limit the value of the set-value signal for engine load.

In the control of diesel engines in diesel-electric locomotives, it is desired to operate the engine on a particular characteristic curve thereof relating power output to engine speed. In this way, the engine will be operated under conditions which are optimal with respect to wear and which simultaneously provide good utilization of the fuel. Consequently, a control system for the diesel engine of a diesel-electric locomotive usually contains means to control the speed of the engine and supplementary means which establish for each engine speed a corresponding load on the engine.

In general, diesel-electric traction vehicles are equipped with series-connected direct current traction motors which are fed from generators having variable excitation. The generators may be direct current (D.C.) generators or they may be alternating current (A.C.) generators working into rectifiers. In diesel-electric locomotive control systems therefore, the fuel injection rate and the generator excitation are the manipulated variables. The term fuel injection rate is employed to denote the quantity of fuel injcted into the engine per operating cycle thereof, e.g. per engine revolution, in the case of a two-stroke cycle engine. The function of the control system is to manipulate these variables so as to attain rapidly and precisely the traction output desired by the engineer, and so far as possible to hold the diesel engine to operation along the desired power-speed characteristic curve therefor.

Various control systems are known operating with hydraulic, pneumatic, electric or electronic means. The mode of operation of these known systems is essentially the following: By adjustment of the control lever operated by the locomotive engineer there is generated a set-value signal for the desired power output and for the diesel engine speed. This signal is proportional to these quantities. Consequently, upon a comparison of this set-value signal with a signal representative of actual engine speed, there is derived an error signal. This error signal is employed, in the servo loop for control of engine speed, as the set-value signal for rate of fuel injection. That is to say, this error signal represents a measure of the desired rate of fuel injection. In accordance with the invention, in order to prevent flooding or overfueling of the engine cylinders, an adjustable upper limit is imposed on this signal in a limiter by means of a signal proportional to pressure in the engine supercharger.

For control of the load on the engine and hence of the output developed thereby, the set-value signal derived from the setting of the engineer's control lever is applied to an electrical function generating circuit or "function transformer" and is thereafter again compared with the error signal derived from the comparison already described between the set-value signal directly derived from the engineer's control lever and the signal representative of engine speed. The result obtained from this second comparison, after amplification in a control amplifier, is employed as the set-value signal in a servo loop for control of generator excitation and thereby of the load imposed on the engine and of the power output demanded from it. The function transformer defines for every engine speed set-value signal a corresponding set-value for the engine load. Since the power output delivered by the engine is substantially proportional to the product of engine speed and rate of fuel injection, the output signal of the function transformer constitutes a measure of the set-value for the power output desired to be delivered by the engine.

In control circuits of the general characteristics hereinabove referred to, it is in practice difficult to obtain satisfactory operation in the face of variations in the set-value of power output and in imposed load such as occur for example upon activation of field-weakening circuits in the traction motors. Both upon increase in the power output set-value signal and upon increases in the actual load, there may occur overloading of the engine. This is reduced by operation of the control system through reduction in generator excitation. Whereas this effect is much to be desired in the case of an overload due to increase in load actually imposed on the engine, e.g. by a grade, and should then be brought to occur as rapidly as possible, it is in case of an increase in the value of the set-value signal contrary to the intentions of the locomotive engineer and can in unfavorable circumstances indeed result in a reduction in power output when precisely the opposite is desired.

The present invention makes it possible to avoid the disadvantages of prior art systems hereinabove described and to improve substantially the dynamic behavior of the control system.

According to the invention, the signal flow channel conducting the set-value signal for engine speed is provided with a limiter imposing a limit on the rate of change of that signal, i.e. on the speed at which that set-value signal, as it emerges from the limiter, can change. Further, in the signal flow channel for the power output set-value signal there is inserted a limiter controlled by a signal representative of the supercharger pressure and which limits the value of the set-value signal. Lastly, in the signal flow channel for the set-value signal representative of generator excitation there is provided a control amplifier having an asymmetrical proportional and integral characteristic.

The limiter which limits the rate of change of the engine speed set-value signal may advantageously be so constructed that upon an increase in that signal as applied to the limiter, a certain maximum rate of change cannot be exceeded in the signal as it emerges from the limiter whereas on the contrary, the limiter imposes no limit on the speed with which that signal may be allowed to decline. It is additionally advantageous to make the limiter for the power output set-value signal operative only at supercharger pressures below a certain value such as for example some 20 or 30 percent of the maximum supercharger pressure. The actual supercharger pressure at which the limiter will come into operation depends upon the design of the diesel engine. The limiting value can vary widely with various engine types and may exceed or fall below the 20 to 30 percent threshold suggested.

Lastly, the asymmetric control amplifier for control of the set-value signal representative of generator excitation may exhibit purely integral action case of an increase in value for that signal whereas upon decline in the value thereof, the amplifier may exhibit proportional-integral action.

The invention will now be further described in terms of a non-limitative example and in connection with the accompanying drawings wherein:

FIG. 1 is a diagram illustrating one embodiment of the invention employing electrical signals and electronic switching and control elements. In FIG. 1 electrical connections are shown as single lines whereas mechanical couplings are shown as double lines; and FIG. 2 is a diagram showing as a function of time the input and output signals of the circuit for limiting the rate of change of the engine speed set-value signal.

Referring to FIG. 1, reference character 1 identifies a generator for generating a set-value signal applied to line $a$ which specifies the desired power output and the desired engine speed. Generator 1 is customarily controlled by the control lever operated by the engineer. From the signal generator 1 the reference signal on line $a$ passes to a junction point 2 from whence it passes to the summing point 3 for control of engine speed, and additionally to summing point 4 for control of engine output by operation on the excitation winding 5 of the electric current generator 6.

The generator 6 is coupled by shaft 7 to the diesel engine, diagrammatically indicated at 8. Via the power lines 9, the generator 6 feeds the locomotive traction motors 10 with direct current. The shaft 7 additionally drives a tachometer generator 11 by means of which the engine speed is measured. The generator 11 develops an electric signal representative of actual engine speed. This signal is delivered via line $b$ to the summing point 3.

In accordance with the invention the set-value signal on line $a$ passes on its way toward point 3 through a rate of change limiter 12. This limiter 12 is asymmetrically constructed so that upon increase in value of the signal input thereto, its rate of change is limited whereas upon decline therein such decline can occur at greater speed. The operation of limiter 12 is schematically indicated in FIG. 2 by means of two time functions. Of these the function 25 identifies an arbitrarily assumed set of variations in the signal applied from generator 1 to limiter 12 and the other function 26 represents the resulting output signal on line $a'$. Additionally, in FIG. 1 there has been shown within the block diagram symbol 12 for the limiter the relation for equilibrium conditions between the input signal at $a$ and the output signal at $a'$.

From the comparison of the signals at $a'$ and at $b$ (by summation at 3) there results the error signal on line $c$. This signal passes through amplifier 13 to emerge at line $c'$, from which it is applied to the junction point 14. Thence it passes to limiter 15, from which it emerges as a modified signal on line $c''$, going to the servo circuit 16 for adjustment of the fuel injectors or fuel injection pumps controlling the rate of fuel injection into the engine 8. The mechanical coupling 17 between the rectangular block diagram symbol 16 for this servo circuit and the engine represents the mechanically driven output of servo 16 which adjusts the mechanical setting of the fuel injection pumps.

The response threshold for the limiter 15 is controlled or adjusted by means of a signal applied to the limiter via line $d$ and which corresponds to the supercharging pressure of the engine, measured in a measuring device 18. The supercharger pressure signal so developed passes from the junction point 19 to the limiter 15. As already indicated, limiter 15 is intended to prevent over-fueling of the engine for the charging air available.

The block diagram rectangle 15 has superimposed thereon a graph representing the relationship between the output signal therefrom at $c''$ and the input signal thereto at $c'$ for three values $d_1$, $d_2$ and $d_3$ of the control signal at $d$.

The set-value signal for desired power output on line $a$ also passes from the junction point 2 into the function transformer 20 in which it is so modified that to each value of the input signal thereto corresponding to a specified engine speed there is allocated a specified load on the engine as output. This is indicated within the rectangular block diagram symbol 20 by the graphical representation there given of the function $e=f(a)$, wherein the symbol $a$ identifies the input to transformer 20 and $e$ identifies the output signal therefrom. As already indicated, the output signal on line $e$ constitutes the set-value signal representative of desired load on the engine and therefore the output power set-value for a given engine speed.

According to the invention, before the set-level signal modified in the transformer 20 reaches the summing point 4 where it is compared with the error signal at $c'$, it is put through limiter circuit 21. This circuit limits the value of the signal on line $e$ in accordance with the value of the signal on line $d$ which is proportional to the supercharger pressure and which comes from the supercharger 18 via junction point 19.

The limiter 21 is preferably so constructed that at low supercharger pressures, for example, those representing from 20 to 30 percent or less of maximum supercharger pressure, the load set-value signal at line $e$ will, upon emerging from the limiter, be limited to a maximum value below that of the load which the diesel engine can carry at the corresponding supercharger pressure. With increasing supercharging pressure the threshold at which limiting begins is rapidly raised so that in operation of the engine on its normal speed-output power curve no limiting occurs. The relation between the input signal to limiter 21 on line $e$ and the output signal therefrom on line $g$ is graphically shown within the block diagram symbol for the limiter, for various values $d_1$, $d_2$ and $d_3$ of the control signal on line $d$ representative of supercharging pressure.

The output from limiter 21 is compared, by algebraic addition at point 4, with the signal on line $c'$. From the comparison made at point 4, there is developed an error signal on line $h$ which, after modification in the control amplifier 22 is delivered over line $h'$ as the set-value signal for generator excitation to the servo 23 which controls the flow of current through the excitation winding 5 of generator 6. In accordance with the invention the control amplifier 22 is asymmetrically constructed so that for changes of the error signal on line $h$ calling for an increase in excitation the amplifier has a purely integral action, whereas in the case of changes of the signal on line $h$ which are to effect a reduction in excitation, the action of the control amplifier 22 is proportional-integral. There has been drawn in on the rectangular block diagram symbol 22 for the control amplifier a graphical representation of the step-response function $h'=f(t)$ wherein $h'$ identifies the output signal on line $h'$ and wherein $t$ identifies time. That is to say, this graphical representation indicates the variation with time of the output signal $h'$, on the assumption that the input signal on line $h$ changes at time $t_0$ from the value zero to a finite, non-zero constant negative value.

The elements 12, 21 and 22 introduced into the control circuit are of known circuit configuration. For example, the velocity of rate of change limiter 12 may comprise an integrator embodied in an amplifier having nearly infinite gain and capacitive feedback, and having an asymmetrical diode limiter at the input thereto. The output from the amplifier is compared with the input to the rate limiter, and the resulting error signal is fed to the integrator via the diode limiter.

The limiters 15 and 21 may take the form of suitable diode circuits in which the diode biases are adjusted as a function of the control voltage applied thereto from line $d$. The function transformer 20 may also take the form of a diode circuit.

The control amplifier 22 having an asymmetric proportional-integral characteristic may take for example the form of a high-gain amplifier wherein the input voltage is fed to the amplifier input through a resistor. This input is coupled to the output of the amplifier through a feedback network which may comprise a serially connected capacity and resistance with a diode in parallel with the resistor. It may be stated that all of these circuits are known in the art of analog computers. (See for instance "Electronics Designers Handbook," McGraw-Hill, New York, 1957, section 19.)

The operation of the control system of the invention as shown in FIG. 1 will now be briefly described. As already indicated, the limiter 12 limits the rate of change of the set-value signal on line $a$ for changes that are in the sense of increasing load. In this way there is achieved the result that the power required to accelerate the diesel engine is held relatively small. During the acceleration phase the engine can, therefore, deliver the power necessary both for its own acceleration and for the tractive effort without being heavily overloaded. In this way, any reduction in power output from severe overloads via the power control circuit is substantially diminished or entirely suppressed. The maximum speed of change of the set-value signal permitted to appear on line $a'$ is adjusted by reference to the characteristics of the engine so that the engine is able to follow the desired speed increase. That is to say, the speed error signal on line $c'$ is during the acceleration phase only slightly greater than on equilibrium operation of the engine at some point on its characteristic curve.

According to the difference between the value of the signal on line $g$ (representing the desired power output set-value signal so far as permitted by the supercharging pressure-operated limiter 21) and the amplified error signal on line $c'$, there is developed a further error signal on line $h$. This signal calls for an increase in excitation when $c'$ is smaller than $g$ and for a decrease in excitation when $c'$ is greater than $g$. Because however the engine speed error signals on line $c'$ are during acceleration only slightly greater than on equilibrium operation, a sudden and long continued reduction in the generator excitation, such as occurs in prior constructions, is avoided.

In the event of accelerations which start at low speeds and lead to a high output set-value the controlled limiter 21 for the output set-value prevents the generator from being too strongly excited at the start, since this would lead to overloading of the diesel engine with increasing diesel engine speeds. The overloading cannot do any damage, since this is prevented by the supercharging protection which acts directly on the fuel injection. The high initial excitation would, however, so increase the loading with increasing speeds that the required acceleration of the diesel engine could no longer be maintained. The controlled limiter 21 according to the invention will always keep the set-value of the output supplied by the diesel engine to the generator somewhat lower than the actual maximum output available on the basis of the supercharging pressure existing at that moment. As the available output increases rapidly as soon as a small supercharging pressure is available, the limitation will operate, as already stated, in a lower range, for example up to 20 to 30 percent of the maximum supercharging pressure, and release the output set-valve as soon as the aforementioned supercharging pressure is reached or exceeded.

The control amplifier 22 must have integral action characteristics to insure that the speed-output-characteristics of the diesel engine are maintained. The integration time constant should be as low as possible to permit rapid compensation of load fluctuations. However, tests have shown that a reduction in the integration time constant tends to cause the entire control system to hunt. A slower, integral reaction is therefore tolerated in the event of underloading of the diesel engine while a proportional action characteristic which becomes operative in the event of overloads insures rapid reduction of the generator excitation and therefore of the diesel engine loading.

The invention is not limited to control systems built up from electronic components, but functions similarly if constructed from suitable hydraulic, pneumatic or other regulating devices.

In exhibiting what is hereinabove called "integral action" (as it does for positive changes in the value of the signal on line $h$), the amplifier 22 will develop from a positive unit function input, as that term is understood in the operational calculus, an output increasing uniformly with time. Thus, if at a given time the input signal on line $h$ changes suddenly from a given value, such as zero, to a constant positively greater value, then beginning at that time the output signal on line $h'$ will increase linearly with time. In exhibiting what is hereinabove called "proportional-integral action" (as it does only for negative changes in the value of the signal on line $h'$), the amplifier 22 will for the same character of input signal, but negative rather than positive, exhibit an output signal which will change suddenly with the change in input signal, and thereafter decrease linearly with time. That is, if at a given time the input signal on line $h$ changes suddenly from a given value, such as zero, to a constant lower or negative value, then at that time the output signal on line $h'$ will suddenly change to a lower or negative value and will thereafter decrease linearly with time.

The invention thus provides a control system for a diesel-electric traction vehicle in which a supercharged diesel engine, shown at 8 in FIG. 1, drives one or more series-connected direct current traction motors as shown at 10, by means of a generator, as shown at 6, having variable excitation, the excitation winding being shown at 5. The control system of the invention comprises means such as the tachometer generator 11 to generate a first signal (on line $b$) representative of engine speed. It also comprises means such as the signal generator 1 responsive to a manually operated control, such as the engineer's control lever $l'$, to generate a second signal (on line $a$). It also comprises means such as the limiter 12 to limit the time rate of change of that second signal. Preferably the limiting means 12 are of asymmetric nature so as to limit the time rate of change of the second signal on line $a$ when its time rate of change is positive more than when its time rate of change is negative. It also comprises means such as the summing device 3 to develop a third signal (on line $c$) from the first signal on line $b$ and from the second signal on line $a'$ as limited with respect to time rate of change by the limiter 12. Preferably the means 3 take the form of a summing network which takes the difference between the signals on lines $a'$ and $b$. It further comprises signal generating means 18 responsive to supercharger pressure in the engine to develop a fourth signal (on line $d$) representative of engine supercharging pressure. It further comprises a variable limiter circuit 15 for the third signal ($c'$), this being the signal on line $c$ as optionally amplified in an amplifier 13, the limiter 15 being responsive in its limiting action to the value of the fourth signal on line $d$. It further comprises servo-mechanism 16 responsive to the third signal as it appears on line $c''$, limited by the variable limiter means 15, to control the rate of fuel injection to the engine. The control system of the invention further includes means such as the function transformer 20 to modify the second signal as it appears on line $a$ into a modified version thereof on line $e$, and it further comprises another variable limiter circuit 21 which operates on the modified second signal on line $e$ to limit the same in a manner responsive to the fourth signal on line $d$ which is applied to that limiter circuit 21. It further comprises summing means as indicated at 4 to develop (from the limited modified second signal appearing on line $g$ and from the third signal on line $c$, optionally as amplified to appear on line $c'$) a fifth signal appearing on line $h$. Advantageously the means 4 take the form of a summing network which takes the difference between the signals on lines $g$ and $c'$ applied to it. The control system further comprises a control amplifier 22 having an asymmetric proportional-integral operation which receives as an input the fifth signal on line $h$, and the control system includes a servo-mechanism as indicated at 23 in FIG. 1 which is responsive to the output from the control amplifier 22 for control of the excitation of the generator at its excitation winding 5.

While the invention has been described herein in terms of a presently preferred embodiment, the invention itself is not limited thereto; rather, the invention comprehends all modifications on and departures therefrom falling within the spirit and scope of the appended claims.

I claim:

1. A control system for a diesel-electric traction vehicle in which a supercharged diesel engine drives a series-connected direct current traction motor by means of a generator having variable excitation, said system comprising means to generate a first signal representative of engine speed, means to generate a second signal, means to limit the time rate of change of said second signal, means to develop a third signal from said first signal and from said second signal limited as to time rate of change, means to develop a fourth signal representative of engine supercharging pressure, first variable limiter means for said third signal responsive to said fourth signal, servo-mechanism responsive to said third signal as limited by said first variable limiter means to control the rate of fuel injection to the engine, means to modify said second signal, second variable limiting means for said modified second signal responsive to said fourth signal, means to develop from said limited modified second signal and from said third signal a fifth signal, a control amplifier having asymmetric proportional-integral operation receiving said fifth signal as an input, and means responsive to the output from said control amplifier for control of the excitation of said generator.

2. A control system according to claim 1 wherein said means to limit the time rate of change of said second signal operate to limit positive time rates of change of said second signal more than negative time rates of change thereof.

3. A control system according to claim 1 wherein said control amplifier has a purely integral action on changes in said fifth signal calling for increase in generator excitation and a proportional-integral action on changes in said fifth signal calling for decrease in generator excitation.

4. A control system according to claim 1 wherein said means to develop a third signal include means to take the difference between said first signal and said second signal limited as to time rate of change, and wherein said means to develop a fifth signal include means to take the difference between said limited modified second signal and said third signal.

5. A control system according to claim 1 wherein said variable limiting means for said modified second signal effect limiting action only for values of said fourth signal representative of supercharging pressures below a threshold pressure less than maximum.

References Cited
UNITED STATES PATENTS

| | | | |
|---|---|---|---|
| 2,914,050 | 11/1959 | Reggio | 123—119 X |
| 3,263,142 | 7/1966 | Adoutte | 318—99 |

RALPH D. BLAKESLEE, *Primary Examiner.*